United States Patent [19]

Van Hemelrijk

[11] Patent Number: 5,759,440
[45] Date of Patent: Jun. 2, 1998

[54] STABILIZED AQUEUOUS SOLUTION OF HYDROGEN PEROXIDE AND PROCESS FOR STABILIZING AN AQUEOUS SOLUTION OF HYDROGEN PEROXIDE

[75] Inventor: Dirck Van Hemelrijk, Antwerp, Belgium

[73] Assignee: Interox (Société Anonyme), Brussels, Belgium

[21] Appl. No.: 488,431

[22] Filed: Jun. 7, 1995

Related U.S. Application Data

[63] Continuation of Ser. No. 326,358, Oct. 20, 1994, abandoned, which is a continuation of Ser. No. 820,851, Mar. 13, 1992, abandoned.

[30] Foreign Application Priority Data

Jul. 20, 1989 [BE] Belgium .................... 8900796

[51] Int. Cl.$^6$ ............ C01B 15/037; D06L 3/02; D21H 11/02
[52] U.S. Cl. ............... 252/186.29; 252/186.28; 252/186.43; 8/111; 162/78
[58] Field of Search ............ 252/186.28, 186.29, 252/186.43; 8/111; 162/78

[56] References Cited

U.S. PATENT DOCUMENTS

| | | | |
|---|---|---|---|
| 2,012,462 | 8/1935 | Alexander et al. | 23/251 |
| 2,027,838 | 1/1936 | Reichert | 252/186.28 |
| 3,206,364 | 9/1965 | Purlee | 167/88 |
| 3,336,112 | 8/1967 | Hooper | 252/186.28 |
| 3,860,391 | 1/1975 | Kling et al. | 8/111 |
| 4,222,819 | 9/1980 | Fossum et al. | 252/186.28 |
| 4,231,890 | 11/1980 | Yagi et al. | 252/186 |
| 4,320,102 | 3/1982 | Dalton, Jr. et al. | 252/186.28 |
| 4,454,224 | 6/1984 | Brien et al. | 430/393 |

FOREIGN PATENT DOCUMENTS

| | | |
|---|---|---|
| 49808 | 1/1982 | European Pat. Off. |
| 1383741 | 2/1974 | United Kingdom |

*Primary Examiner*—Joseph D. Anthony
*Attorney, Agent, or Firm*—McDermott Will & Emery

[57] ABSTRACT

Aqueous solution of hydrogen peroxide stabilized by incorporation of a composition containing a mixture of an alkali metal pyrophosphate or alkaline earth metal pyrophosphate with a stabilizer belonging to the category of aminopolycarboxylic acids corresponding to the following general formula:

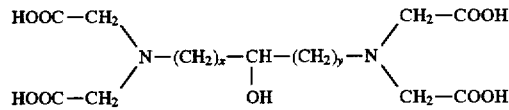

where
x is an integer equal to 0, 1 or 2 and
y is also an integer equal to 0, 1 or 2;
and salts of these acids.

The solution finds application for bleaching textiles and paper pulps.

16 Claims, No Drawings

STABILIZED AQUEOUS SOLUTION OF HYDROGEN PEROXIDE AND PROCESS FOR STABILIZING AN AQUEOUS SOLUTION OF HYDROGEN PEROXIDE

This is a continuation of U.S. application Ser. No. 08/326,358, filed Oct. 20, 1994, now abandoned which is a continuation of U.S. application Ser. No. 07/820,851, filed Mar. 13, 1992, now abandoned.

The present invention relates to aqueous solutions of hydrogen peroxide stabilized against decomposition into oxygen and water by means of compositions containing organic stabilizers belonging to the family of aminopolycarboxylic acids.

The process for stabilizing aqueous solutions of hydrogen peroxide by means of such stabilizers also falls within the scope of the invention.

It is known to use 1,3-diamino-2-hydroxypropane-N,N,N',N'-tetraacetic acid to stabilize per-compounds (GB-1383741 (CIBA-GEIGY, AG) * page 1, lines 44 to 61 *). However, this compound is not stable in the presence of per-compounds and is rapidly converted during storage, giving rise to degradation products which no longer have a stabilizing effect on the solutions of per-compounds.

The object of the invention is solutions of hydrogen peroxide effectively stabilized in the long term by the incorporation of a composition containing an aminopolycarboxylic acid.

To this end, the invention relates to an aqueous solution of hydrogen peroxide stabilized by means of a composition containing a mixture of an alkali metal pyrophosphate or alkaline earth metal pyrophosphate with a stabilizer belonging to the category of aminopolycarboxylic acids, in which composition the stabilizer is an aminopolycarboxylic acid corresponding to the following general formula:

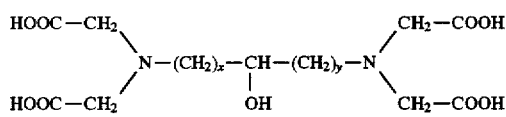

where x is an integer equal to 0, 1 or 2 and y is also an integer equal to 0, 1 or 2;

or a salt of this acid.

An aqueous solution of hydrogen peroxide is understood to be any aqueous solution of hydrogen peroxide in which the concentration by weight is between 0.1 and 99 g $H_2O_2$/100 g of solution and preferably 0.5 and 95%. Advantageously, this solution can be a commercial solution of hydrogen peroxide having a concentration by weight of between 25 and 70 g $H_2O_2$/100 g of solution.

Most frequently it is advantageous that the numbers x and y in the general formula of the aminopolycarboxylic acid are such that their sum is not greater than 3 and preferably not greater than 2.

According to another variant of the process according to the invention, which is preferred, the aminopolycarboxylic acid which is used is such that the numbers x and y which occur in its formula are equal.

An aminopolycarboxylic acid which has given particularly worthwhile results is 1,3-diamino-2-hydroxypropane-N,N,N',N'-tetraacetic acid.

According to a supplementary variant of the process according to the invention, the numbers x and y in the general formula of the aminopolycarboxylic acid are such that one of them is zero. In such a case it is desirable that the other number differs from zero and, for example, is 1.

According to the invention, the salts of the aminopolycarboxylic acid comprise the salts resulting from the replacement of the hydrogen atom or one or more of the four carboxyl groups of the aminopolycarboxylic acid by a metal cation or by ammonium. The metal cation is preferably an alkali metal or alkaline earth metal cation. The alkali metals and ammonium are particularly recommended.

Hereinafter the term aminopolycarboxylate will denote the aminopolycarboxylic acids and their salts according to the invention.

In the stabilizing compositions according to the invention, the proportion by weight of pyrophosphate and of aminopolycarboxylate can vary between 0.2 and 4.0 and preferably between 0.7 and 1.3. Excellent results have been obtained with a ratio by weight of pyrophosphate : aminopolycarboxylate of 1.0.

The optimum content of pyrophosphate/aminopolycarboxylate composition in the aqueous solutions of hydrogen peroxide depends on various parameters, in particular on the hydrogen peroxide concentration of the solution, its pH and the aminocarboxylate selected. In practice, it is generally desirable that the aqueous solution of hydrogen peroxide contains at least 0.5 mg of pyrophosphate/aminopolycarboxylate composition per kg of solution, and preferably not more than 1500 mg. The preferred contents are between 1 and 300 mg.

The invention applies without differentiation to hydrogen peroxide solutions which are acid, neutral or basic. In particular, it finds an advantageous application for acid solutions which have a pH of between 2 and 5.

Examples of such solutions are the hydrogen peroxide solutions used for cleaning optical glasses, in particular contact lenses, the $H_2O_2$ solutions for hydrometallurgy, in particular in extraction of metals by leaching the ores, the $H_2O_2$ solutions for engraving, cleaning and polishing metals (for example the baths for chemical polishing of copper, such as those described in Patent Application FR-A-87.13407 (SOLVAY & Cie)), the $H_2O_2$ solutions used for protection of the environment, such as those used for detoxification of liquid or gaseous effluents and those used for the purification of water, the $H_2O_2$ solutions used in the foodstuffs industry and, in particular, those used for disinfecting packaging and containers.

According to an advantageous embodiment of the invention, the aqueous solution of hydrogen peroxide can be an aqueous bleaching bath containing hydrogen peroxide in a concentration of between 0.5 and 50 g $H_2O_2$/100 g of solution. Examples of such bleaching baths are the washing or bleaching liquors containing hydrogen peroxide for textile materials and the bleaching liquors containing hydrogen peroxide for paper pulps.

In the techniques for bleaching paper pulps using aqueous solutions of hydrogen peroxide it can sometimes prove advantageous to pretreat the paper pulp to be bleached with a pyrophosphate/aminopolycarboxylate composition of the same type as those used in accordance with the invention as defined hereinabove before carrying out the bleaching treatment with hydrogen peroxide. This latter technique is particularly interesting when the pulp to be bleached belongs to the category of high-yield pulps.

The invention also relates to a process for stabilizing an aqueous solution of hydrogen peroxide, according to which a composition containing a mixture of an alkali metal pyrophosphate or alkaline earth metal pyrophosphate with a stabilizer belonging to the category of the aminopolycarboxylic acids corresponding to the following general formula:

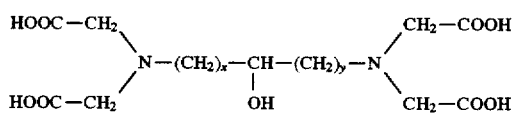

where x is an integer equal to 0, 1 or 2 and y is also an integer equal to 0, 1 or 2;

or salts of these acids is incorporated in the aqueous solution.

The invention has the advantage of providing aqueous solutions of hydrogen peroxide which have a long-term stability which is improved in respect of the decomposition induced by heavy metal and transition metal cations compared with known organic and inorganic stabilizers. The non-limiting examples which follow are given with the aim of illustrating the invention.

EXAMPLES 1R to 14

Passivation of the equipment

The equipment used in all of the examples which will be given below was subjected beforehand to a passivation treatment with the aim of eliminating the interfering effect of impurities adsorbed on the surface in contact with the stabilized hydrogen peroxide solutions used.

To carry out this treatment, all of the glassware which may be brought into contact with $H_2O_2$ was immersed in a 65% by weight aqueous solution of $HNO_3$ and the whole was kept at 75° C. for 24 hours.

Long-term stability tests

An 85% by weight aqueous solution of hydrogen peroxide, twice-distilled water, the stabilizer and a solution of metal ions containing $FeCl_3$ and $CuCl_2$ in a ratio of 5 moles of $FeCl_3$ to 1 mole of $CuCl_2$ were mixed in a 1 l conical flask passivated as described above. The amounts of the various components used were calculated to make up two types of final mixture containing, respectively, 35 g $H_2O_2/100$ g of solution and 70 g $H_2O_2/100$ g of solution as well as 5 mg of metals (expressed as Fe+Cu) per kg of solution and 250 mg of stabilizer (containing 100% of active material) per kg of solution.

The results obtained are given in Tables I (35% by weight $H_2O_2$) and II (70% by weight $H_2O_2$), which follow.

In Experiments 5R, 7, 12R and 14, where a mixture of two stabilizers was used, 125 mg of each of the two stabilizers was introduced per kg of solution.

The stabilizers used were, on the one hand, 1,3-diamino-2-hydroxypropane-N,N,N',N'-tetraacetic acid (designated DPTA below) according to the invention and, on the other hand, some known stabilizers which are not in accordance with the invention and belong to 2 distinct groups, that is to say a polyphosphonate manufactured by Monsanto and sold under the brand name DEQUEST, and two stabilizers of the inorganic type. These various stabilizers were used on their own or as a mixture and have been designated by the following abbreviations: PYRO: $Na_2H_2P_2O_7$: sodium pyrophosphate, STAN: $Na_2SnO_3$: sodium stannate. D2066: diethylenetriaminepenta(Na methylenephosphonate), where the abbreviation D2066 symbolizes the product DEQUEST® from Monsanto.

TABLE I

| | | Analysis of the solution after | | | | | | | | | |
|---|---|---|---|---|---|---|---|---|---|---|---|
| | | 0 | | 1 | | 2 months | | 3 | | 4 | |
| Experiment No. | Nature of the stabilizer | $H_2O_2$ % | Losses % | $H_2O_2$ % | Losses % | $H_2O_2$ % | Losses % | $H_2O_2$ % | Losses % | $H_2O_2$ % | Losses % |
| 1R | None | 34.9 | 0 | 2.0(*) | 94.3 | — | — | — | — | — | — |
| 2R | PYRO | 34.9 | 0 | 24.4 | 30.1 | 18.2 | 47.9 | 13.5 | 61.3 | 10.6 | 69.6 |
| 3R | DPTA | 35.2 | 0 | 2.4 | 93.2 | — | — | — | — | — | — |
| 4R | D2066 | 35.0 | 0 | 32.3 | 7.7 | 27.9 | 20.3 | 24.9 | 28.9 | 20.5 | 41.4 |
| 5R | D2066 + PYRO | 34.9 | 0 | 26.7 | 23.5 | 21.4 | 38.7 | 16.5 | 65.1 | 13.5 | 61.3 |
| 6R | STAN | 34.5 | 0 | 29.0 | 15.9 | 24.4 | 29.3 | 21.1 | 38.8 | 16.7 | 51.6 |
| 7 | DPTA + PYRO | 34.9 | 0 | 35.0 | 0 | 35.0 | 0 | 35.4 | 0 | 35.2 | 0 |

(*)after 1 day

TABLE II

| | | Analysis of the solution after | | | | | | | | | |
|---|---|---|---|---|---|---|---|---|---|---|---|
| | | 0 | | 1 | | 2 months | | 3 | | 4 | |
| Experiment No. | Nature of the stabilizer | $H_2O_2$ % | Losses % | $H_2O_2$ % | Losses % | $H_2O_2$ % | Losses % | $H_2O_2$ % | Losses % | $H_2O_2$ % | Losses % |
| 8R | None | 69.9 | 0 | 9.0(*) | 87.1 | — | — | — | — | — | — |
| 9R | PYRO | 69.7 | 0 | 58.7 | 15.8 | 48.3 | 30.7 | 38.0 | 45.5 | 31.1 | 55.4 |
| 10R | DPTA | 70.2 | 0 | 8.4 | 88.0 | — | — | — | — | — | — |
| 11R | D2066 | 70.3 | 0 | 66.5 | 5.4 | 60.2 | 14.4 | 56.0 | 20.3 | 48.9 | 30.4 |
| 12R | D2066 + PYRO | 69.7 | 0 | 61.6 | 11.6 | 50.8 | 27.1 | 47.5 | 31.9 | 42.1 | 39.6 |

TABLE II-continued

|  |  | Analysis of the solution after | | | | | | | | |
|---|---|---|---|---|---|---|---|---|---|---|
|  |  | 0 | | 1 | | 2 | | 3 | | 4 |
|  |  | | | | | months | | | | |
| Experiment No. | Nature of the stabilizer | $H_2O_2$ % | Losses % | $H_2O_2$ % | Losses % | $H_2O_2$ % | Losses % | $H_2O_2$ % | Losses % | $H_2O_2$ % | Losses % |
| 13R | STAN | 70.3 | 0 | 66.7 | 5.1 | 60.2 | 14.4 | 55.4 | 21.2 | 46.6 | 33.7 |
| 14 | DPTA + PYRO | 69.7 | 0 | 69.9 | 0 | 70.2 | 0 | 69.1 | 0.9 | 68.7 | 1.4 |

(*)after 1 day

The results clearly show the synergistic effect produced by DPTA and PYRO in accordance with the solution according to the invention.

I claim:

1. A process for stabilizing an aqueous solution of 25 to 99 weight percent of acidic hydrogen peroxide comprising:
   adding to the solution a composition, comprising: a mixture of an alkali metal pyrophosphate or alkaline earth metal pyrophosphate and an aminopolycarboxylic acid of the formula:

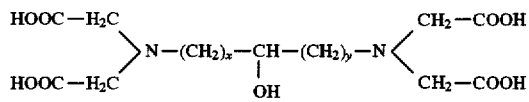

wherein x is an integer selected from the group consisting of 0, 1 and 2, and y is an integer selected from the group consisting of 0, 1 and 2; or a salt of the acid,
   wherein the proportion by weight of the pyrophosphate to the aminopolycarboxylate is between 0.7 and 1.3, and
   wherein the aqueous solution comprises from 1 to 300 mg of the pyrophosphate and aminopolycarboxylate composition per kg of said aqueous solution.

2. A process for stabilizing an aqueous solution of 25 to 99 weight percent of acidic hydrogen peroxide, comprising:
   adding to the solution a composition consisting essentially of a mixture of an alkali metal pyrophosphate or alkaline earth metal pyrophosphate and an aminopolycarboxylic acid of the formula:

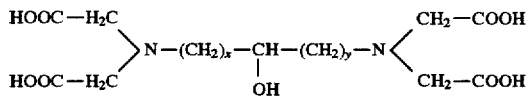

wherein, x is an integer selected from the group consisting of 0, 1 and 2, and y is an integer selected from the group consisting of 0, 1 and 2; or a salt of the acid,
   wherein the proportion by weight of the pyrophosphate to the aminopolycarboxylate is between 0.7 and 1.3, and
   wherein the aqueous solution comprises from 1 to 300 mg of the pyrophosphate and aminopolycarboxylate composition per kg of said aqueous solution.

3. A method for washing or bleaching textiles, comprising:
   contacting said textiles with an aqueous solution comprising:
   25 to 99 weight percent of acidic hydrogen peroxide stabilized with a composition comprising a mixture of an alkali metal pyrophosphate or alkaline earth metal pyrophosphate and an aminopolycarboxylic acid of the formula:

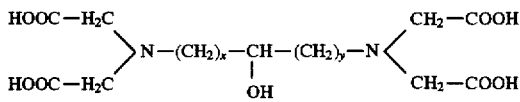

wherein x is an integer selected from the group consisting of 0, 1 and 2 and y is an integer selected from the group consisting of 0, 1 and 2; or a salt of the acid,
   wherein the proportion by weight of the pyrophosphate to the aminopolycarboxylate is between 0.7 and 1.3, and
   wherein the aqueous solution comprises from 1 to 300 mg of the pyrophosphate and aminopolycarboxylate composition per kg of said aqueous solution.

4. A method for bleaching paper pulp, comprising:
   contacting said paper pulp with an aqueous solution comprising:
   25 to 99 weight percent of acidic hydrogen peroxide stabilized with a composition comprising a mixture of an alkali metal pyrophosphate or alkaline earth metal pyrophosphate and an aminopolycarboxylic acid of the formula:

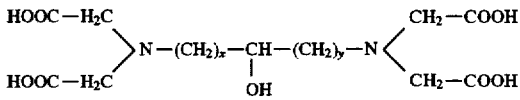

wherein x is an integer selected from the group consisting of 0, 1 and 2 and y is an integer selected from the group consisting of 0, 1 and 2; or a salt of the acid,
   wherein the proportion by weight of the pyrophosphate to the aminopolycarboxylate is between 0.7 and 1.3, and
   wherein the aqueous solution comprises from 1 to 300 mg of the pyrophosphate and aminopolycarboxylate composition per kg of said aqueous solution.

5. An aqueous solution, comprising:
   25 to 99 weight percent of acidic hydrogen peroxide stabilized with a composition comprising a mixture of an alkali metal pyrophosphate or alkaline earth metal pyrophosphate and an aminopolycarboxylic acid of the formula:

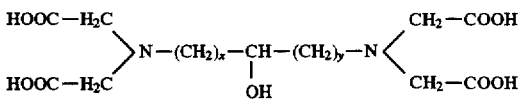

wherein x is an integer selected from the group consisting of 0, 1 and 2 and y is an integer selected from the group consisting of 0, 1 and 2; or a salt of the acid, wherein the proportion by weight of the pyrophosphate to the aminopolycarboxylate is between 0.7 and 1.3, and wherein the aqueous solution comprises from 1 to 300 mg of the pyrophosphate and aminopolycarboxylate composition per kg of said aqueous solution.

6. The aqueous solution of claim 5, wherein the proportion by weight of the alkali metal pyrophosphate or the alkaline earth metal pyrophosphate to the aminopolycarboxylic acid or the salt of the acid is 1.0.

7. The aqueous solution of claim 5, wherein the sum of x and y is not greater than 3.

8. The aqueous solution of claim 7, wherein the sum of x and y is not greater than 2.

9. The aqueous solution of claim 5, wherein x and y have the same value.

10. The aqueous solution of claim 9, wherein the aminopolycarboxylic acid is 1,3-diamino-2-hydroxypropane-N, N,N',N'-tetraacetic acid.

11. The aqueous solution of claim 5, comprising: a commercially available concentrated solution having a concentration of between 25 and 95% by weight of hydrogen peroxide.

12. The aqueous solution of claim 11, further comprising a concentration of between 25 and 70% by weight of hydrogen peroxide.

13. The aqueous solution of claim 5, wherein one of the integers x or y is 0.

14. The aqueous solution of claim 13, wherein the other integer is other than 0.

15. The aqueous solution of claim 14, wherein the other integer is 1.

16. An aqueous solution, comprising:

25 to 99 weight percent of acidic hydrogen peroxide stabilized with a composition consisting essentially of a mixture of an alkali metal pyrophosphate or alkaline earth metal pyrophosphate and an aminopolycarboxylic acid of the formula:

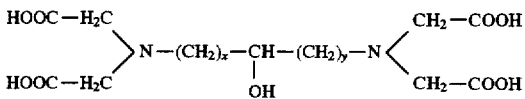

wherein x is an integer selected from the group consisting of 0, 1 and 2, and y is an integer selected from the group consisting of 0, 1 and 2; or a salt of the acid, wherein the proportion by weight of the pyrophosphate to the aminopolycarboxylate is between 0.7 and 1.3, and wherein the aqueous solution comprises from 1 to 300 mg of the pyrophosphate and aminopolycarboxylate composition per kg of said aqueous solution.

* * * * *